US010209772B2

(12) United States Patent
Dow et al.

(10) Patent No.: US 10,209,772 B2
(45) Date of Patent: Feb. 19, 2019

(54) HANDS-FREE TIME SERIES OR CHART-BASED DATA INVESTIGATION

(71) Applicant: INTERNATIONAL BUSINESS MACHINES CORPORATION, Armonk, NY (US)

(72) Inventors: Eli M. Dow, Wappingers Falls, NY (US); Thomas D. Fitzsimmons, Lancaster, PA (US); Maurice M. Materise, Williamsville, NY (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/269,063

(22) Filed: Sep. 19, 2016

(65) Prior Publication Data
US 2018/0081431 A1 Mar. 22, 2018

(51) Int. Cl.
*G06F 3/01* (2006.01)
*G06T 11/20* (2006.01)

(52) U.S. Cl.
CPC .............. *G06F 3/013* (2013.01); *G06F 3/012* (2013.01); *G06T 11/206* (2013.01)

(58) Field of Classification Search
CPC . G06F 3/01; G06F 3/011; G06F 3/012; G06F 3/013; G06Q 30/02; G06Q 30/0277; G06Q 30/0241; G06Q 30/0251
See application file for complete search history.

(56) References Cited

U.S. PATENT DOCUMENTS

| 6,577,329 | B1 * | 6/2003 | Flickner | G06Q 30/02 715/774 |
| 8,854,282 | B1 * | 10/2014 | Wong | G06F 3/14 345/7 |
| 9,285,874 | B2 | 3/2016 | Bychkov et al. | |
| 2009/0177528 | A1 * | 7/2009 | Wu | G06Q 30/02 705/14.44 |
| 2010/0007601 | A1 | 1/2010 | Lashina et al. | |
| 2014/0168056 | A1 * | 6/2014 | Swaminathan | G06K 9/00604 345/156 |
| 2014/0247277 | A1 | 9/2014 | Guenter et al. | |

(Continued)

FOREIGN PATENT DOCUMENTS

| WO | 2013036236 A1 | 3/2013 | |
| WO | WO 2016146486 A1 * | 9/2016 | G06K 9/00597 |

OTHER PUBLICATIONS

Mershack Okoe, et al.: "A Gaze-enabled Graph Visualization to Improve Graph Reading Tasks"; Eurographics Conference on Visualization (EuroVis); vol. 33, No. 3; 2014; pp. 10.

*Primary Examiner* — Benjamin C Lee
*Assistant Examiner* — Dong Hui Liang
(74) *Attorney, Agent, or Firm* — Cantor Colburn LLP (57) ABSTRACT

Described herein are methods, systems, and computer program products for providing supplementary information with an initial visualization. To provide supplementary information, a display device can provide the initial visualization, a gaze tracker can capture gaze direction data from a user viewing the initial visualization, and a processor of a computing device can process the gaze direction data to determine a point of interest. The display device can then provide the supplementary information with the initial visualization based on the point of interest.

17 Claims, 4 Drawing Sheets

(56) References Cited

U.S. PATENT DOCUMENTS

| | | | |
|---|---|---|---|
| 2014/0267010 A1* | 9/2014 | Pasquero | G06T 19/006 345/156 |
| 2014/0267771 A1* | 9/2014 | Lawler | G06K 9/00597 348/169 |
| 2015/0106386 A1* | 4/2015 | Lee | G06F 3/013 707/748 |
| 2015/0234457 A1* | 8/2015 | Kempinski | G06K 9/00604 345/156 |
| 2015/0309569 A1 | 10/2015 | Kohlhoff et al. | |
| 2016/0282937 A1* | 9/2016 | Thorn | G06T 17/00 |
| 2016/0301862 A1* | 10/2016 | Rantakokko | G06F 3/011 |

\* cited by examiner

HANDS-FREE TIME SERIES OR CHART-BASED DATA INVESTIGATION

BACKGROUND

In general, when rendering supplementary information on or for charts and graphs, a processor must execute a plurality of preloading activities to support the rendering. The preloading of exhaustive and potentially relevant activities is expensive in computational terms and creates a cluttered user interface.

For example, consider a time series graph of a stock price over ten year period that includes a dramatic spike or dip, which calls an attention of a user. When the user selects the dramatic spike or dip, the processor renders supplementary information that may be relevant to a user's interpretation of the entire time series graph by pre-loading all relevant activities, which can span a year or more of time series information.

It is thus desirable to provide a mechanism for pre-loading activities at a reduced computational cost and for streamlining interface graphics.

SUMMARY

According to one embodiment, a method is provided. The method comprises providing, by a display device of a gaze detection system, an initial visualization; capturing, by a gaze tracker of the gaze detection system, gaze direction data from a user viewing the initial visualization; processing, by a processor of a computing device of the gaze detection system, the gaze direction data to determine a point of interest; and providing, by the display device of the gaze detection system, supplementary information with the initial visualization based on the point of interest. The method embodiment can be implemented as a computer program product or a system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

The disclosure relates generally to hands-free time series or chart-based data investigation, and more specifically, to system, method, and/or computer program product embodiments that integrate gaze detection of a user with computer software to enable data investigation and presentation with respect to charts and graph. For instance, embodiments described herein can extract a point of interest from a time series based on gaze detection of a presentation of the time series, to retrieve and annotate the time series presented asynchronously as user interest demands further explanatory information regarding said series.

Gaze detection is the process of measuring a motion of an eye relative to a position of a head to detect a gaze direction (where a user is looking). The motion of the eye comprises horizontal, vertical, and torsion eye positions and movements. The position of the head comprises head position and head direction. Gaze detection can be implemented by a gaze tracker integrated with a processing system.

Figure 1:
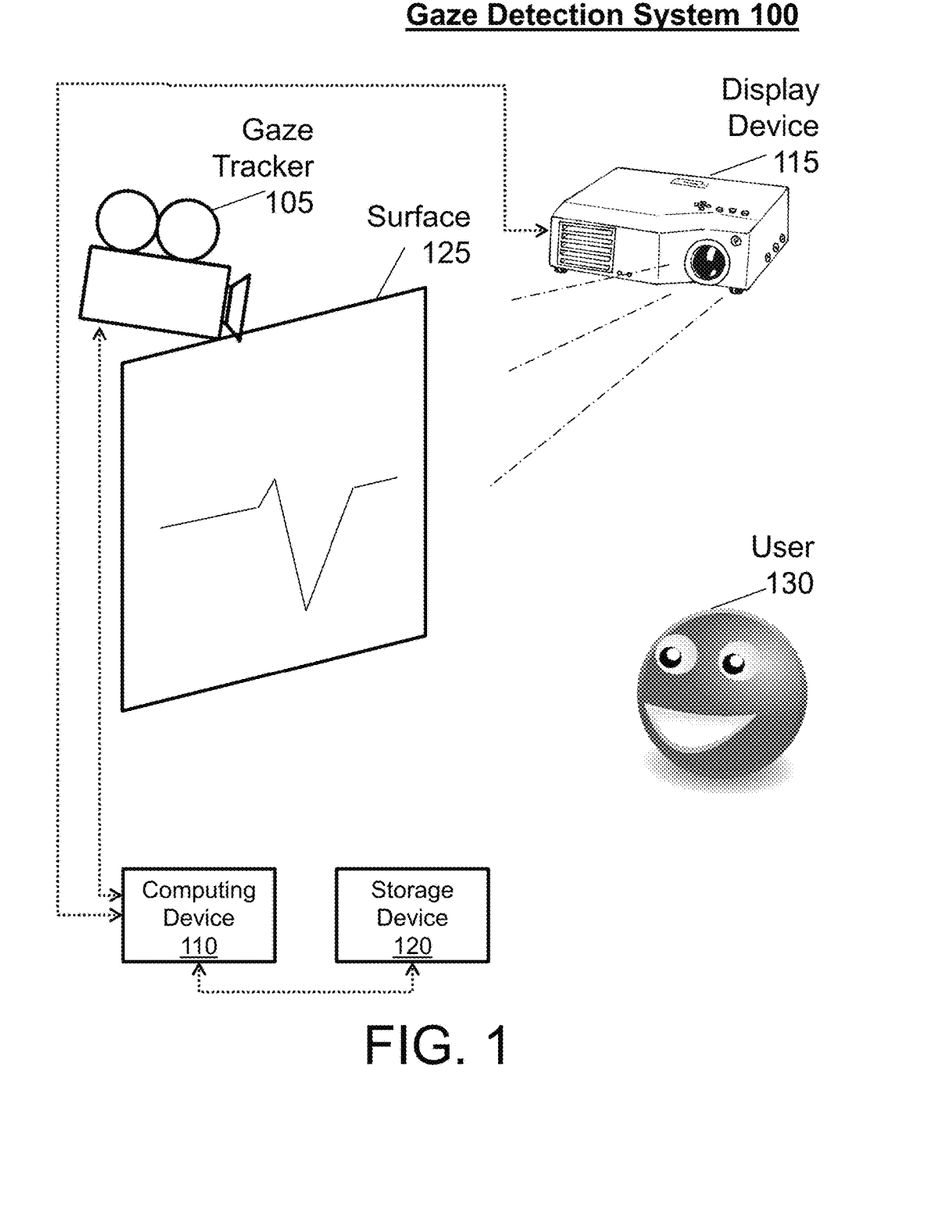
FIG. 1 illustrates a communication schematic of a gaze detection system in accordance with an embodiment.

Turning now to FIG. 1, a communication schematic of a gaze detection system 100 is generally shown in accordance with an embodiment. The gaze detection system 100 includes a gaze tracker 105, a computing device 110, a display device 115, and storage device 120, each of which is in electrical communication through wired and/or wireless mechanisms. The gaze detection system 100 also includes a surface 125 and a user 130. Note that user 130 is representative of one or more users.

The gaze tracker 105 is a device for capturing the motion of the eye and position of the head (herein referred to as gaze direction data) of the user 130. The gaze tracker 105 can be separate from the display device 115 and the computing device 110, as shown in FIG. 1, or integrated with the display device 115 and/or the computing device 110 in a housing.

An example of gaze trackers 105 includes optical tracking devices. Optical tracking devices are non-contact, non-invasive optical devices that include a camera or some other designed optical sensor (e.g., webcams, video cameras, mobile phones, etc.). In an example operation, light (e.g., infrared light) is reflected from one or more eyes and sensed by the camera to capture gaze direction data. Optical tracking devices that are video-based eye trackers (e.g., use a video camera) can utilize a corneal reflection and a center of a pupil to capture gaze direction data over time. Other examples of video-based eye trackers include dual-Purkinje eye tracker and internal eye feature trackers.

Other examples of gaze trackers 105 include eye-attaching tracking devices, and electrical potential measurement devices. Eye-attaching tracking devices utilize one or more eye attachments, such as a special contact lens with an embedded mirror or magnetic field sensor, that move with the eye as the eye rotates (e.g., do not slip as the eye rotates) to provide the gaze direction data. Electric potential measurement devices utilize electric potentials measured with electrodes placed around the eyes to capture gaze direction data.

The computing device 110 is any combination hardware and/or software that analyze the gaze direction data with respect to the display device 115. The computing device 110 comprises integration software such that the gaze trackers 105 operatively communication with an operating system, browser, and/or window manager of the computing device 110, along with a web page, JavaScript, and/or similar software library framework/runtime, to provide supplementary information with an initial visualization of the display device 115. Supplementary information includes background data, tooltips, or statistical computations that underlie the initial visualization. Initial visualizations comprise graphic user interfaces presented to the user 130 by the display device 115, such as graphs, charts, diagrams, multimedia content, and other complex data visualizations.

For instance, the gaze direction data is analyzed by the computing device 110 to determine the gaze direction of the user 130, which is aligned with the initial visualization of the display device 115 to determine a point of interest. The point of interest is a location of the initial visualization that the user 130 is looking at. Once the point of interest is determined, the computing device 110 communicates with the storage device 120 to acquire supplementary information for the visualization related to that point of interest.

The display device 115 is an output device for presentation of information in visual form (e.g., the initial visualizations and/or the supplementary information). The display device 115 can provide the supplementary information as pop-ups or additional annotations aligned with the gaze direction of the user 130 based on an instruction from the computing device 110. Example of display devices include plasma display panels, light-emitting diode displays, liquid crystal displays, electroluminescent displays, cathode ray tube displays, organic light-emitting diode (OLED) displays, projector displays, etc. In the embodiment of FIG. 1, the display device 115 is a projector that provides the initial visualizations and/or the supplementary information on the surface 125, which is any suitable screen, panel, or the like that can support an image.

The storage device 120 is any combination hardware and/or software that stores charting, graphing, and/or data presentation libraries that provide the supplementary information. The storage device 120 can be integrated into the computing device 110 or in electrical communication through a network (e.g., such as a local area network, a cloud-based network, or the Internet).

Note that by utilizing the gaze direction data, gaze direction, and point of interest to access the libraries of the storage device 120, the supplementary information can be provided with high-efficiency load times. With high-efficiency load times, any initial visualization can be less cluttered, as a default, due to graphics of the supplementary information being streamlined upon the interest of the user 130.

Figure 2:
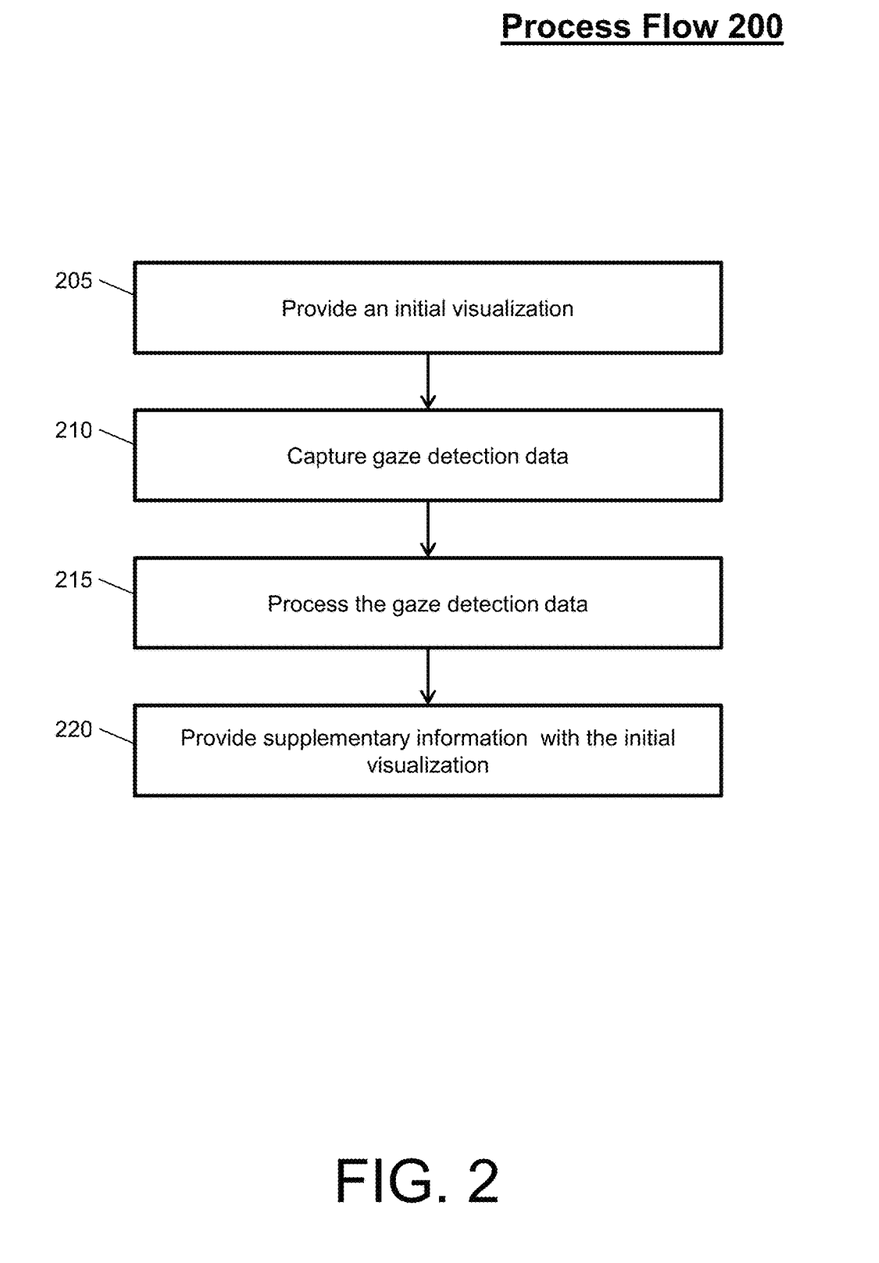
FIG. 2 illustrates a process flow of a gaze detection system in accordance with an embodiment.

Turning now to FIG. 2, a process flow 200 of the above gaze detection system 100 of FIG. 1 is described in accordance with an embodiment. The process flow 200 begins at block 205, where the display device 115 provides an initial visualization. In the case of FIG. 1, the initial visualization is provided on the surface 125, while the gaze tracker 105 is monitoring for one or more users.

At block 210, the gaze tracker 105 captures gaze detection data. For instance, when the user 130 approaches the surface 125, the gaze tracker 105 detects the user 130 viewing the initial visualization. Upon detection of the user 130, the gaze tracker 105 detects a head and one or two eyes of the user 130. Upon detection of the head and the one or two eyes, the gaze tracker 105 captures the motion of the one or two eyes and position of the head as gaze direction data. This gaze direction data is then communicated from the gaze tracker 105 to the computing device 110.

At block 215, the computing device 110 processes the gaze detection data. For instance, the gaze direction data combines the motion of the one or more eyes with position (and direction) of the head of the user 130 to determine the gaze direction of the user 130. In an embodiment, the distance of the user 130 from the surface 125 is also utilized to determine the gaze direction. The gaze direction is then aligned by the computing device 110 with the initial visualization of the display device 115 to determine a point of interest. The point of interest indicates what part of the initial visualization that the user 130 is interested in.

At block 220, the display device 115 provides the supplementary information with the initial visualization. In this regard, once the point of interest is determined, the computing device 110 communicates with the storage device 120 to acquire supplementary information for the visualization associated with that point of interest from the storage device 120. The supplementary information is then supplied to the display device 115 by the computing device 110 in graphic form so as to be provided with the initial visualization. Note that the process flow 200 can be repeated for each user 130 (for each of the one or more users) that approaches and views the initial visualization.

Figure 3:
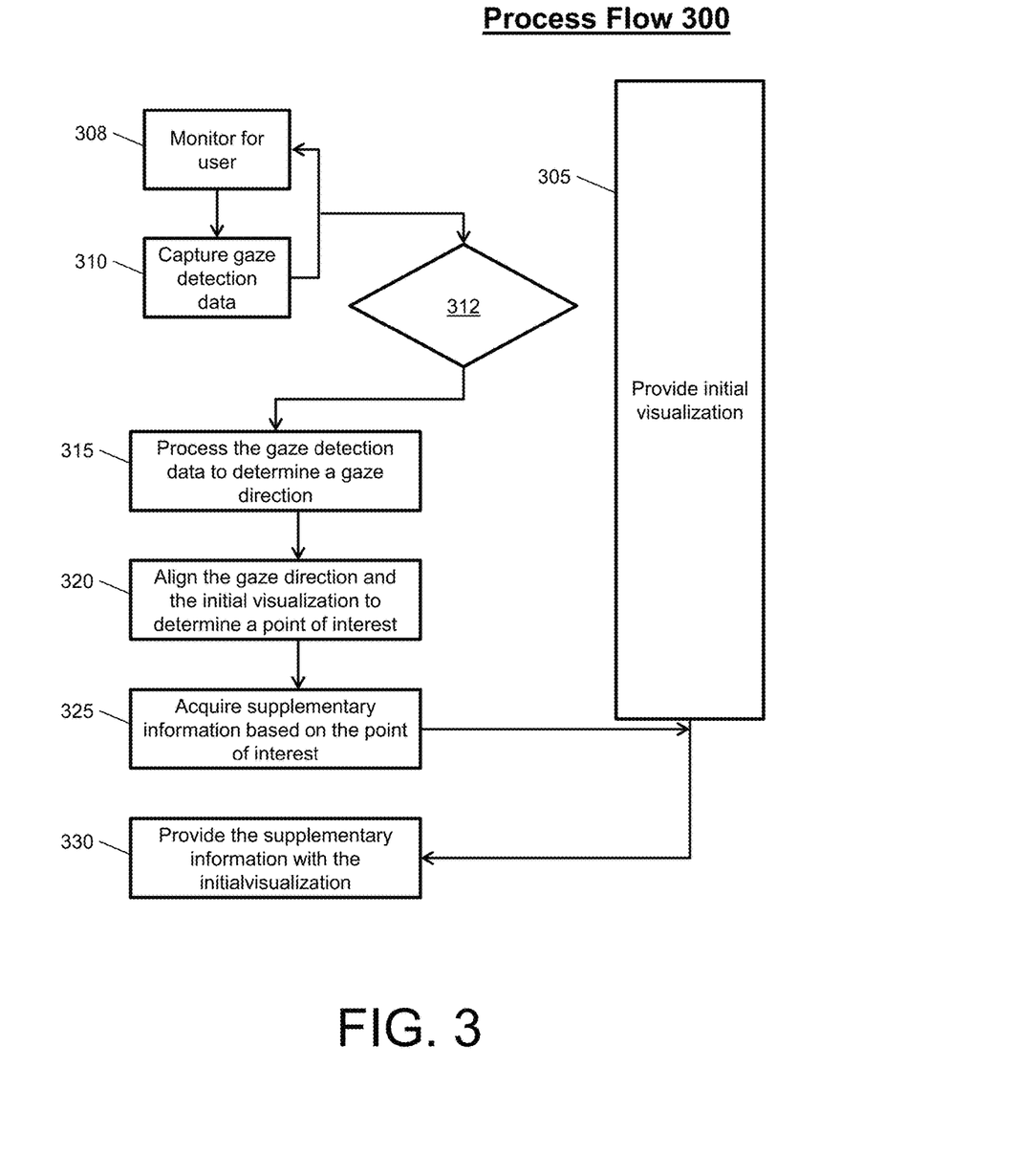
FIG. 3 illustrates a process flow of a gaze detection system in accordance with another embodiment.

Turning now to FIG. 3, a process flow 300 of a gaze detection system is described in accordance with an embodiment. The process flow 300 begins at blocks 305 and 310. At block 305, the display device provides an initial visualization. The initial visualization can be providing by the display device, while a gaze tracker, a storage device, and a computing device perform the operations of blocks 308, 310, 312, 315, 320, and 325. Note that, in an embodiment, the display device, the computing device, the storage device, and the gaze tracker can be included in the same housing, such as an OLED display integrated with a video camera, a memory, and a processor.

At block 308, the gaze tracker monitors for one or more users (as the display device provides the initial visualization). For example, the gaze tracker monitors for one or more users, such that the gaze tracker can detect the arrival of each user when that user approaches and rests before the combined display device and gaze tracker. At block 310, the gaze tracker can begin capturing gaze detection data upon arrival of each user (as the display device provides the initial visualization). The gaze tracker can continue to capture the gaze detection data while each user is viewing the initial visualization. In this way, the gaze tracker can provide the gaze detection data as a constant stream of raw detection data to the computing device.

At decision block 312, the computing device monitors for any instance within the gaze detection data to indicate a long visual inspection. For example, the computing device process the user head and eye positions/motions over time to determine if the positions/motions remain constant or fail to change within a threshold degree for a predetermined time. The positions/motions remaining constant indicate that the gaze direction is not changing, while the positions/motions failing to change within a threshold degree indicates minimal movement. The threshold degree can be equal to or less than 20 degrees of movement. The predetermined time can be 2 or more seconds.

When the positions/motions remain constant or fail to change within the threshold degree for the predetermined time, the process flow 300 can proceed to block 315 asynchronously. For example, the initial visualization can be a time series of stock prices. While the user is viewing the time series on the display device, a segment of interest (a certain stock price) can receive a long visual inspection by the user. The computing device is ignorant as to where the user is looking until the user looks at the certain stock price for a time equal to or longer than the predetermined time. In this way, unnecessary processing for a gaze direction and point of interest can be avoided, along with unnecessary acquiring of supplemental data. Thus, processing can begin when the eye sees something "interesting" long enough to warrant a follow-up for further data (supplementary information) around that time period.

At block 315, the computing device processes the gaze detection data to determine a gaze direction. At block 320, the computing device aligns the gaze direction with the initial visualization to determine a point of interest. The processing of the gaze direction and the point of interest are executed dynamically. Note that the process flow 300 can be repeated for each user of the one or more users that approaches and views the initial visualization to determine multiple points of interest. In an embodiment, if multiple users are gazing, the computing device can resort to a group quorum to determine common regions of interest.

At block 325, the computing device communicates with the storage device to acquire supplementary information associated with that point of interest from the storage device. The operation of blocks 315, 320, and 325 can be performed while the display device provides the initial visualization. Continuing with the above stock example, the computing device can load all information blurbs, media press releases, dividends, real-time data extracted from third party providers, etc. related to the certain stock price dynamically based on the gaze direction and point of interest. Note that, with respect to multiple users, the process flow can coordinate the multiple points of interest and/or common regions of interest to acquire supplementary information for one or all of the user interests.

At block 330, the display device provides the supplementary information with the initial visualization. In this regard, the computing device communicates the acquired supplementary information and the initial visualization in graphic form to the display device for display. The presentation of the supplementary information can remain for as long as the user gazes at the information plus a predetermined amount of time (e.g., 2 or more seconds). Once the predetermined amount of time expires, the supplementary information can fade and/or be removed and the process flow 300 can return to block 305. In the case of multiple users, the predetermined amount of time can be increased based on the number of users.

Figure 4:
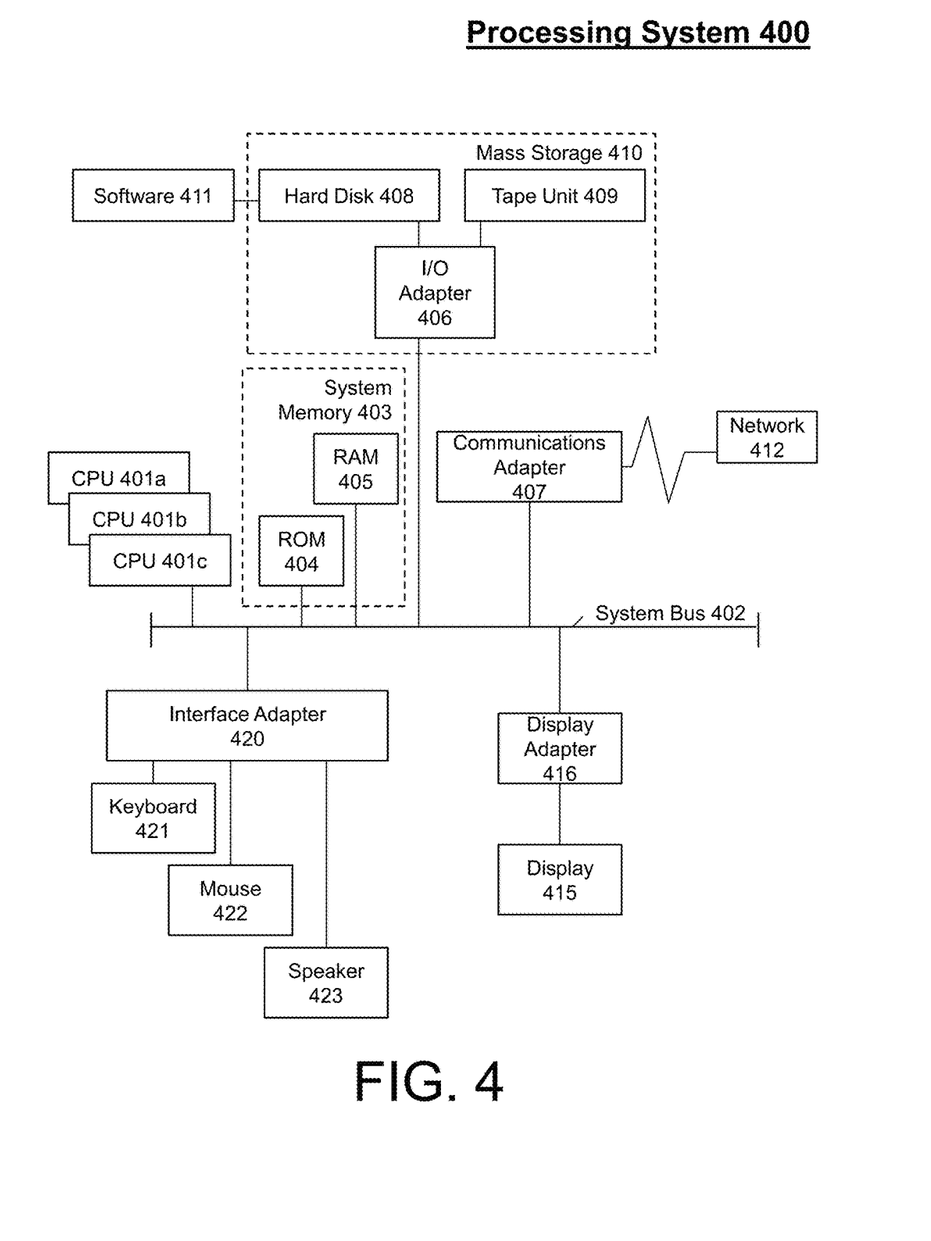
FIG. 4 illustrates a processing system in accordance with an embodiment.

Referring now to FIG. 4, there is shown an embodiment of a processing system 400 for implementing the teachings herein. In this embodiment, the processing system 400 has one or more central processing units (CPU(s)) 401a, 401b, 401c, etc. (collectively or generically referred to as processor(s) 401). The processors 401, also referred to as processing circuits, are coupled via a system bus 402 to system memory 403 and various other components. The system memory 403 can include a read only memory (ROM) 404 and a random access memory (RAM) 405. The ROM 404 is coupled to system bus 402 and may include a basic input/output system (BIOS), which controls certain basic functions of the processing system 400. The RAM is read-write memory coupled to the system bus 402 for use by the processors 401.

FIG. 4 further depicts an input/output (I/O) adapter 406 and a communications adapter 407 coupled to the system bus 402. The I/O adapter 406 may be a small computer system interface (SCSI) adapter that communicates with a hard disk 408 and/or tape unit (tape storage drive) 409 or any other similar component. The I/O adapter 406, the hard disk 408, and the tape unit 409 are collectively referred to herein as a mass storage 410. A software 411 for execution on the processing system 400 may be stored in the mass storage 410. The mass storage 410 is an example of a tangible storage medium readable by the processors 401, where the software 411 is stored as instructions for execution by the processors 401 to perform a method, such as the process flows of FIGS. 2-3. A communications adapter 407 interconnects the system bus 402 with a network 412, which may be an outside network, enabling the processing system 400 to communicate with other such systems. A display (e.g., display device, screen, a display monitor) 415 is connected to the system bus 402 by a display adapter 416, which may include a graphics controller to improve the performance of graphics intensive applications and a video controller. In one embodiment, the adapters 406, 407, and 416 may be connected to one or more I/O buses that are connected to the system bus 402 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 402 via an interface adapter 420 and the display adapter 416. A keyboard 421, a mouse 422, and a speaker 423 can be interconnected to the system bus 402 via the interface adapter 420, which may include, for example, a Super I/O chip integrating multiple device adapters into a single integrated circuit.

Thus, as configured in FIG. 4, the processing system 400 includes processing capability in the form of the processors 401, and, storage capability including the system memory 403 and the mass storage 410, input means such as the keyboard 421 and the mouse 422, and output capability including the speaker 423 and the display 415. In one embodiment, a portion of the system memory 403 and the mass storage 410 collectively store an operating system, such as the z/OS or AIX operating system from IBM Corporation, to coordinate the functions of the various components shown in FIG. 4.

Technical effects and benefits include high-efficiency load times and less cluttered/streamlined graphics interfaces as default presentation layer of complex data visualization. Thus, embodiments described herein are necessarily rooted in processor to perform proactive operations to overcome problems specifically arising in the realm of data visualization.

Embodiments may include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executed by a gaze detection system comprising a gaze tracker, a display device, and a computing device integrated into a housing of the display device system, the method comprising:
   providing, by the display device, an initial visualization;
   monitoring, by the gaze tracker, one or more of a plurality of users approaching the display device;
   capturing, by the gaze tracker, gaze direction data from the plurality of users viewing the initial visualization, wherein the gaze direction data comprises an eye motion, a head position, and a head direction of each of the plurality of users, wherein the gaze tracker comprises one or more non-contact, non-invasive optical sensors that receive and sense infrared light reflected from at least one eye of each of the plurality of users to capture the gaze direction data;

processing, by a processor of the computing device, the gaze direction data to determine multiple points of interest for the plurality of users;

determining, by the processor, a common region of the multiple points of interest to acquire supplementary information for all of the plurality of users; and providing, by the display device, a presentation of the supplementary information with the initial visualization based on the common region, the presentation of the supplementary information remains for as long as the plurality of users gaze at the presentation of the supplementary information plus a predetermined amount of time, wherein the presentation of the supplementary information fades or is removed when the predetermined amount of time expires, and wherein the predetermined amount of time is adjusted based on a number the plurality of users.

2. The method of claim 1, wherein the gaze tracker, the display device, and the computing device are integrated into a housing of the gaze detection system.

3. The method of claim 1, wherein the supplementary information comprises background data, tooltips, or statistical computations that underlie the initial visualization.

4. The method of claim 1, wherein the initial visualizations comprises a graphic user interface presented by the display device in a form of at least one of a graph, a chart, a diagrams, or multimedia content.

5. The method of claim 1, wherein the computing device communicates with a storage device of the gaze detection system to acquire the supplementary information associated with the common region.

6. The method of claim 1, wherein the computing device supplied the supplementary information to the display device in graphic form to be provided with the initial visualization.

7. A computer program product, the computer program product comprising a computer readable storage medium having program instructions embodied therewith, wherein a gaze detection system comprises a gaze tracker, a display device, and a computing device integrated into a housing of the display device system, the program instructions executable by a processor of the computing device to cause:

providing, by the display device, an initial visualization;

monitoring, by the gaze tracker, one or more of a plurality of users approaching the display device;

capturing, by the gaze tracker communicatively coupled to the processor, gaze direction data from the plurality of users viewing the initial visualization, wherein the gaze direction data comprises an eye motion, a head position, and a head direction of the plurality of users, wherein the gaze tracker comprises one or more non-contact, non-invasive optical sensors that receive and sense infrared light reflected from at least one eye of each of the plurality of users to capture the gaze direction data;

processing, by the processor, the gaze direction data to determine multiple points of interest for the plurality of users;

determining, by the processor, a common region of the multiple points of interest to acquire supplementary information for all of the plurality of users; and providing, by the display device, a presentation of the supplementary information with the initial visualization based on the common region, the presentation of the supplementary information remains for as long as the plurality of users gaze at the presentation of the supplementary information plus a predetermined amount of time, wherein the presentation of the supplementary information fades or is removed when the predetermined amount of time expires, and wherein the predetermined amount of time is adjusted based on a number the plurality of users.

8. The computer program product of claim 7, wherein the gaze tracker and the display device are integrated into a housing of a gaze detection system.

9. The computer program product of claim 7, wherein the supplementary information comprises background data, tooltips, or statistical computations that underlie the initial visualization.

10. The computer program product of claim 7, wherein the initial visualizations comprises a graphic user interface presented by the display device in a form of at least one of a graph, a chart, a diagrams, or multimedia content.

11. The computer program product of claim 7, wherein the processor communicates with a storage device of a gaze detection system to acquire the supplementary information associated with the common region.

12. The computer program product of claim 7, wherein the processor supplied the supplementary information to the display device in graphic form to be provided with the initial visualization.

13. A gaze detection system, comprising:
a display device;
a gaze tracker;
a computing device having a processor; and
a memory storing program instructions thereon,
the program instructions executable by the processor to cause the system to perform:
providing, by the display device, an initial visualization;
monitoring, by the gaze tracker, one or more of a plurality of users approaching the display device;
capturing, by the gaze tracker, gaze direction data from the plurality of users viewing the initial visualization,
wherein the gaze direction data comprises an eye motion, a head position, and a head direction of the plurality of users,
wherein the gaze tracker comprises one or more non-contact, non-invasive optical sensors that receive and sense infrared light reflected from at least one eye of each of the plurality of users to capture the gaze direction data;
processing, by the processor, the gaze direction data to determine multiple points of interest for the plurality of users;
determining, by the processor, a common region of the multiple points of interest to acquire supplementary information for all of the plurality of users; and
providing, by the display device, a presentation of the supplementary information with the initial visualization based on the common region, the presentation of the supplementary information remains for as long as the plurality of users gaze at the presentation of the supplementary information plus a predetermined amount of time, wherein the presentation of the supplementary information fades or is removed when the predetermined amount of time expires, and wherein the predetermined amount of time is adjusted based on a number the plurality of users.

14. The system of claim 13, wherein the gaze tracker, the display device, and the computing device are integrated into a housing of the gaze detection system.

15. The system of claim 13, wherein the supplementary information comprises background data, tooltips, or statistical computations that underlie the initial visualization.

16. The system of claim 13, wherein the initial visualizations comprises a graphic user interface presented by the display device in a form of at least one of a graph, a chart, a diagrams, or multimedia content.

17. The system of claim 13, wherein the computing device communicates with a storage device of the gaze detection system to acquire the supplementary information associated with the common region.

* * * * *